United States Patent [19]

Hidejima et al.

[11] Patent Number: 5,675,572
[45] Date of Patent: Oct. 7, 1997

[54] ORTHOGONAL FREQUENCY DIVISION MULTIPLEX MODULATION APPARATUS AND ORTHOGONAL FREQUENCY DIVISION MULTIPLEX DEMODULATION APPARATUS

[75] Inventors: Yasuhiro Hidejima, deceased, late of Kanagawa; Takako Hidejima, legal representative, Yokohama; Yasunari Ikeda, Kanagawa, all of Japan

[73] Assignee: Sony Corporation, Tokyo, Japan

[21] Appl. No.: 281,274

[22] Filed: Jul. 27, 1994

[30] Foreign Application Priority Data

Jul. 28, 1993 [JP] Japan .................................. 5-186095

[51] Int. Cl.$^6$ .................................. H04T 11/00
[52] U.S. Cl. .................... 370/206; 370/210; 370/343; 370/480; 375/260; 375/340
[58] Field of Search ............................ 370/23, 19, 20, 370/69.1, 49.5, 50, 203, 208, 209, 210, 310, 343, 344, 464, 480, 481, 482, 484; 375/222, 300, 301, 320, 321, 260, 261, 264, 340

[56] References Cited

U.S. PATENT DOCUMENTS

| | | | |
|---|---|---|---|
| 4,884,139 | 11/1989 | Pommier | 348/21 |
| 5,065,451 | 11/1991 | Leveque | 455/72 |
| 5,228,025 | 7/1993 | Le Floch et al. | 370/206 |
| 5,311,550 | 5/1994 | Fouche et al. | 370/210 |
| 5,345,440 | 9/1994 | Gledbill et al. | 370/210 |
| 5,454,010 | 9/1995 | Leveque | 375/202 |
| 5,506,836 | 4/1996 | Ikeda et al. | 370/19 |

OTHER PUBLICATIONS

"Multicarrier Transmission Technique in Cellular Mobile Communications Systems" Reiners et al.; Vehicular Technology, 1994 Conference, pp. 1645–1649.

*Primary Examiner*—Alpus H. Hsu
*Assistant Examiner*—Seema S. Rao
*Attorney, Agent, or Firm*—William S. Frommer; Alvin Sinderbrand

[57] ABSTRACT

An orthogonal frequency division multiplex (OFDM) modulation apparatus which can transmit just one of single side bands by a simple circuit and an OFDM demodulation apparatus superior in the ratio of the signal power to noise power ratio, wherein a serial/parallel converter converts the input signal from the serial to parallel format, inputs the results to the 1 to N−1 stage of an inverse discrete Fourier transformation (IDFT) circuit, and inputs a fixed value to the other stages (0 stage and N stage to 2N−1 stage). The IDFT circuit is a 2N input IDFT circuit which performs IDFT processing on the input signal converted to the parallel format by the serial/parallel converter and inputs the real number portion of the transformation result to a parallel/serial converter and the imaginary number portion to a parallel/serial converter. The imaginary number portion of the output signal of the IDFT circuit becomes the Hilbert transformation of the real number portion. These output signals are combined by modulation by two orthogonal carrier wave signals of the same frequency so as to take out just a single side band signal of the demodulated signal.

5 Claims, 10 Drawing Sheets

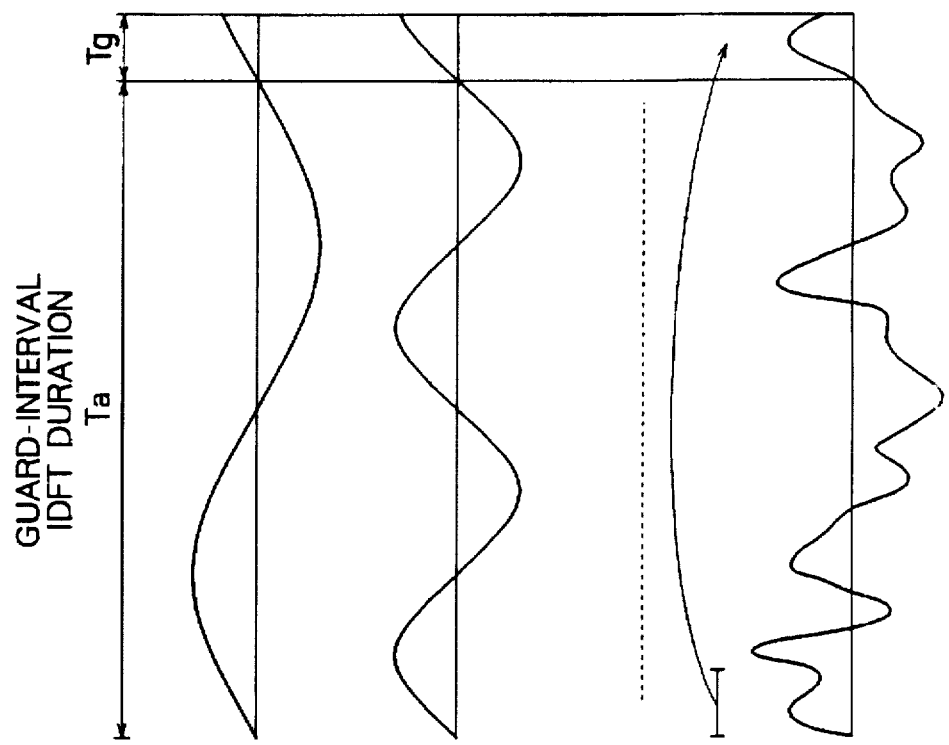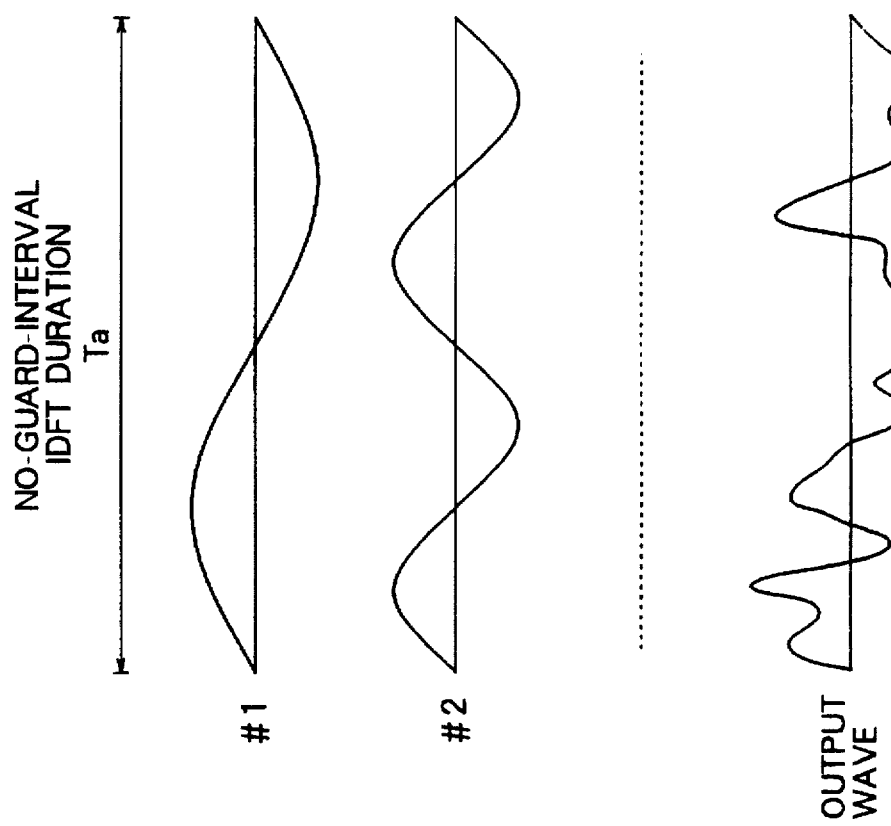

ORTHOGONAL FREQUENCY DIVISION MULTIPLEX MODULATION APPARATUS AND ORTHOGONAL FREQUENCY DIVISION MULTIPLEX DEMODULATION APPARATUS

BACKGROUND OF THE INVENTION

1. Field of the Invention

The present invention relates to a digital modulation apparatus for digitally modulating a signal, more particularly to an orthogonal frequency division multiplex (OFDM) modulation apparatus for modulating an OFDM signal having 0 as the amplitude of a specific frequency component, and relates to an OFDM demodulation apparatus for demodulating this OFDM signal.

2. Description of the Related Art

When transmitting digital signals, there are known the methods of phase modulation (PM) or amplitude modulation (AM) of a single frequency carrier wave signal based on a digital signal.

As a specific example of such modulation methods, there are known phase shift keying (PSK) for changing only the phase of the carrier wave signal and quadrature amplitude modulation (QAM) for changing both the phase and the amplitude of the carrier wave signal.

In the above modulation methods, the single frequency carrier wave signal is modulated so as to have an occupied bandwidth of an extent fitting in the transmission band.

Recently, as a new modulation method, proposal has been made of the modulation method known as the orthogonal frequency division multiplex (OFDM) modulation method.

In OFDM modulation, a plurality of orthogonal carrier wave signals are generated in the transmission band so that they divide the transmission band and the carrier wave signals are each subjected to PSK processing or QAM processing by digital signals.

Since OFDM modulation divides the transmission band by a plurality of carrier wave signals, the band per carrier wave signal becomes narrow and the modulation time per carrier wave signal becomes long. However, the overall transmission time obtained as a result of the modulation of each of the plurality of the carrier wave signals in a given transmission band is no different from the modulation methods used widely previously, for example, the PSK and QAM methods.

In OFDM modulation, a plurality of carrier wave signals are transmitted in parallel, so the transmission rate per digital data to be transmitted, that is, symbol, becomes slower. In a transmission path with so-called multiple path interference, it is possible to reduce the relative delay time of the multiple path interference wave with respect to the time length for symbols. As a result, OFDM modulated signals are resistant to the effects of multiple path interference. Application of OFDM modulation to transmission of digital signals by earth waves taking advantage of this point is drawing great interest.

For signal processing in OFDM modulation, it is necessary to perform inverse discrete Fourier transformation (IDFT) at a high speed, while for signal processing in OFDM demodulation, it is necessary to perform discrete Fourier transformation (DFT) at a high speed.

In the past, it was difficult to realize such signal processing inexpensively and at a high speed, but recent advances in electronics technology and semiconductor technology have made possible the provision of semiconductor devices which can perform DFT and IDFT efficiently by hardware-like processing and electronic circuits using the same. Accordingly, it has become possible to perform OFDM modulation, or OFDM demodulation, using such semiconductor devices and electronic circuits.

The characterizing feature of OFDM modulation is that orthogonal carrier wave signals are generated for each predetermined bandwidth obtained by dividing a transmission channel (transmission band). The OFDM modulated signals are digital signals of a low data transmission rate which can fit in their respective bandwidths. The individual carrier wave signals are not modulated by digital signals, but all carrier wave signals are modulated all at once by IDFT processing.

A summary of the OFDM modulation will be given below.

On the transmission side performing the OFDM modulation, waveforms of carrier wave signals corresponding to the values "1" or "0" of the digital data to be transmitted are defined for a plurality of carrier wave signals #1 to #n. By adding up and combining the carrier wave signals #1 to #n showing the values of the digital data to be transmitted, OFDM modulated signals are obtained. That is, if these carrier wave signals #1 to #n are arranged in order on the frequency axis and the amplitude and phase of the carrier wave signals are defined by the digital data to be transmitted, it is possible to define the waveform of the data (symbols) of the OFDM modulated signals in a predetermined time length by the digital data to be transmitted.

At the receiving side which demodulates the OFDM modulated signals, the OFDM modulated signals are received and the waveforms of the carrier wave signals are discriminated to establish correspondence with digital data, whereby it is possible to demodulate the OFDM modulated digital data sent from the transmission side for each carrier wave signal.

In OFDM modulation, it is possible to transmit the digital data by defining the carrier wave signals by two phase states and modulating them by the binary PSK (BPSK) method and also possible to define a large number of phases and amplitudes and transmit the data in multilevels.

Digital data given multiple values for each of a plurality of carrier wave signals is transmitted by defining the amplitude and phase of the carrier wave signals and obtaining the waveforms of the same. The processing operation for obtaining the waveforms is the so-called IDFT processing. Therefore, in OFDM modulation, it is possible to obtain an OFDM modulated signal using an IDFT circuit.

Conversely, the OFDM modulated signal obtained by IDFT processing in this way can be demodulated by DFT processing on the receiving side.

An explanation will be next made of the conventional OFDM modulation apparatus 90 referring to FIG. 1.

FIG. 1 is a view of the configuration of the OFDM modulation apparatus 90.

The OFDM modulation apparatus 90 is comprised of a serial/parallel (S/P) converter 803, an IDFT circuit 805, a parallel/serial (P/S) converter 806, a buffer memory 808, a digital to analog (D/A) converter 810, a low pass filter 812, a multiplier 814, a local oscillator 816, a band pass filter 819, an RF converter 820, a transmitting antenna 821, and a buffer memory control circuit 901.

Here, in the case of multivalue modulation of the carrier wave signals, the input signal is parallel data in accordance with that multivalue level. Further, the transmission signal is an OFDM modulated signal obtained as a result of modulation by the OFDM modulation apparatus 90.

The OFDM modulation apparatus 90 shown in FIG. 1, for simplification of the explanation, is shown as one which performs one-dimensional modulation such as BPSK.

Therefore, there is one system of input signals (transmission path data) and only the real number part of the input of the IDFT circuit 805 is used.

The OFDM modulation apparatus 90 is not limited to this configuration and may for example perform a general two-dimensional modulation apparatus.

In the case of two-dimensional modulation, the transmission path data is used as the I channel input and Q channel input and input to the real number part and imaginary number part of the IDFT circuit.

FIG. 2 is a view of the configuration of the S/P converter 803 shown in FIG. 1 and the connections with the IDFT circuit 805.

When performing IDFT processing in the 2N sampling value IDFT circuit 805 for the N−1 number of serial format input sampling values (signals), the input signals are successively input to the N−1 stage shift register 8031 and converted to parallel signals, and then, as shown in FIG. 2, are latched at the 1 stage to N−1 stage and to the 2N−1 to N+1 stage.

At the remaining stages (0 stage and N stage) of the latch 8032, a fixed value (0) is latched. This is applied along with the input sampling values latched in the latch 8032 to the IDFT circuit 805.

However, the data latched at these stages does not have to be 0 but may be other suitable data as well.

By the above operation, the number of the carrier wave signals of the OFDM modulated signal input to the IDFT circuit 805 is made (N−1).

If the signal converted to a parallel format at the S/P converter 803 is subjected to IDFT processing at the IDFT circuit 805, the result of the IDFT becomes just the real number part and the output from the imaginary number part disappears. The reason is that the input signals to the IDFT circuit 805 are made symmetrical data by the S/P converter 803.

The data from the IDFT circuit 805 is output as 2N number of parallel data. This output data is converted to serial data by the 2N input 1 output P/S converter 806.

FIGS. 3A to 3C show signal frequency spectra of the different parts of the OFDM modulation apparatus 90.

FIG. 3A shows the frequency spectrum of the output signal of the low pass filter 812, FIG. 3B the frequency spectrum of the output signal of the multiplier 814, and FIG. 3C the frequency spectrum of the band pass filter 819.

A look at the frequency spectra of the different parts of the OFDM modulation apparatus 90 shows that the output signal of the low pass filter 812 has the frequency spectrum shown in FIG. 3A while the frequency spectrum of the output signal of the multiplier 814 spreads to the upper and lower side bands as shown in FIG. 3B. To transmit the necessary data, however, it is sufficient to transmit just a single side band in the output signal of the multiplier 814. Accordingly, from the viewpoint of the effective utilization of bands, just the single side band has been selected using the band pass filter 819, as shown in FIG. 3C, and has been transmitted converted to the transmission frequency band by the radio frequency (RF) converter 820.

A band pass filter 819 which extracts just a single side band from the output signal of the multiplier 814, however, should have a sharp cutoff characteristic. It has been difficult to realize such a characteristic.

An explanation will next be made of an OFDM demodulation apparatus 95 for demodulating the OFDM modulated signal modulated by the OFDM modulation apparatus 90.

FIG. 4 is a view of the configuration of the OFDM demodulation apparatus 95.

The OFDM demodulation apparatus 95 is comprised of a receiving antenna 851, a tuner 852, a multiplier 853, a local oscillator 855, a low pass filter 857, an A/D converter 859, a S/P converter 861, a DFT circuit 863, P/S converters 864 and 865, a buffer memory 866, and a carrier wave reproduction circuit 868.

The operation of the OFDM demodulation apparatus 95 will be explained below.

The signal captured by the receiving antenna 851 is amplified and converted to a predetermined intermediate frequency by the tuner 852. The intermediate frequency signal is multiplied by the multiplier 853 with the local oscillation signal input from the local oscillator 855 to be converted to the base band signal.

This analog base band signal is filtered by the low pass filter 857 and is converted to a digital format by the A/D converter 859.

The S/P converter 861 converts the parallel format digital base band signal output from the A/D converter 859 to parallel signals of the number of the inputs of the DFT circuit 863 and inputs the results to the DFT circuit 863.

The DFT circuit 863, which performs transformation on the 2N number of input data, performs DFT processing on the base band signals input as the time waveforms so as to demodulate the amplitudes of the carrier wave signals. In this way, the DFT circuit 863 demodulates the OFDM modulated signal which had been converted to the base band.

The demodulated signals are converted to serial signals by the P/S converters 864 and 865 and further input to the buffer memory 866.

The DFT circuit 863 transforms the 2N number of input samples to obtain 2N number of transformation outputs.

By using N number of data out of the 2N number of transformation output data, it is possible to demodulate the base band signals. The remaining N number of data do not contribute to the demodulation.

The reason is that since the input data to the IDFT circuit 805 is made symmetrical data by the S/P converter 803 at the OFDM modulation apparatus 90 side, the output data of the DFT circuit 863 at the demodulation side also becomes symmetrical data and therefore there is only N number of significant output data.

Accordingly, the buffer memory 866 takes in only half (N−1) of the data of the transformation results of the P/S converter 864, converts the bit rate, and produces the output data from the same.

The carrier wave reproduction circuit 868 controls the local oscillator 855 by Costas loop control and correctly reproduces the local oscillation signal used at the time of converting the received signal to the base band signal.

To use a Costas loop for the reproduction of the carrier wave signals of the OFDM modulated signal, it is necessary to compute the carrier wave signal orthogonal to the phase of the signal output of the local oscillator 855 and the modulated signal.

However, when receiving the BPSK OFDM modulated signal, it is possible to use the imaginary number portion of the DFT circuit 863 as the demodulated output based on the carrier wave signal consisting of the output signal of the local oscillator shifted 90°, so when the phase of the carrier wave signal of the local oscillator 855 is correctly reproduced, the imaginary number portion of the transformation result of the DFT circuit 863 always becomes 0 and only the real number portion becomes significant.

The OFDM modulation apparatus 90 shown in FIG. 1, for simplification of the explanation, is treated as one which modulates the carrier wave signals using the one-dimensional modulation method known as the BPSK modulation method. Accordingly, even at the OFDM demodulation apparatus 95 side, only the real number part of the output data of the DFT circuit 863 is treated as having significance.

On the other hand, when performing modulation by the general two-dimensional modulation method in the OFDM modulation apparatus 90, not only the real number part, but also the imaginary number part of the results of transformation by the DFT circuit 863 have significance.

That is, the real number part of the results of transformation by the DFT circuit 863 becomes the so-called I channel data (signal) and the imaginary number part the Q channel signal.

Further, at the receiving side, as shown in FIG. 4, only the real number part input was used as the input to the DFT circuit 863, so the ratio of the received signal power to the noise power was not necessarily improved.

SUMMARY OF THE INVENTION

The present invention was made as an improvement of the conventional OFDM modulation apparatus and demodulation apparatus and has as its object the provision of an OFDM modulation apparatus and OFDM demodulation apparatus which enable by means of a simple circuit the transmission of just a single side band.

Another object of the present invention is to provide an OFDM demodulation apparatus superior in the ratio of the received signal power to the noise power.

According to an aspect of the present invention, there is provided an OFDM modulation apparatus comprised of a frequency domain/time domain converting means for converting an input signal from a frequency domain to a time domain and outputting the results of the conversion divided into a real number portion and imaginary number portion and an orthogonal transformation means for using the real number portion and imaginary number portion of the results of conversion to modulate and combine carrier wave signals having a phase difference of 90° from each other.

The OFDM modulation apparatus of the present invention performs IDFT by allocating transmission data to only a predetermined portion as input data for the IDFT means and by using the same fixed value, for example, 0, as the remaining input data, modulates the real number part output of the results of the IDFT by a local oscillation frequency, modulates the imaginary number part output by shifting this local oscillation output 90°, and combines the modulated outputs of the real number part and the imaginary number part to thereby obtain just a single side band.

Further, preferably, the frequency domain/time domain converting means is a means for performing IDFT on the parallel format digital data and further has an input signal converting means. The input signal converting means inputs the input signal into just the predetermined portion of the input of the frequency domain/time domain converting means and inputs the same fixed value to the remaining portion.

More preferably, the fixed value is 0.

According to another aspect of the present invention, there is provided an OFDM demodulation apparatus which comprises:

a frequency conversion and signal division means for converting the input OFDM modulated signal to two base band signals using local oscillation signals different 90° in phase and a time domain/frequency domain converting means for converting these base band signals from the time domain to the frequency domain using the same as input of the real number portion and input of the imaginary number portion and outputs just the predetermined portions of said base band signals by using the predetermined transformation coefficients as the demodulated output.

Preferably, the time domain/frequency domain converting means performs DFT on the OFDM modulation apparatus converted to digital format parallel data which has been input.

Further, by processing the input data with the IDFT means at the OFDM modulation apparatus side as above, it is possible to take out the real number part output and imaginary number part output of the IDFT as a Hilbert transformation pair and by combining these two outputs by modulating them by orthogonal carrier wave signals, it is possible to take out just one side band of the resulting side band pair and modulate the same.

The OFDM demodulation apparatus of the present invention uses the OFDM modulated signal converted to a base band by the local oscillation signal as the real number part input for the DFT, uses the OFDM modulated signal converted to a base band by a signal consisting of the local oscillation output shifted 90° as the imaginary number part input of the DFT, and uses only the former half or the latter half of the DFT result of the input signals as the demodulated data.

Further, by demodulating the received signal by orthogonal carrier wave signals at the OFDM demodulation apparatus side and inputting the results of demodulation to the real number part and imaginary number part of the DFT converting means, it is possible to double the level of the input signal to the DFT means and therefore possible to improve the ratio of the signal power to the noise power of the demodulated output.

BRIEF DESCRIPTION OF THE DRAWINGS

The above objects and features of the present invention, along with other objects and features, will be more apparent from the following description made with reference to the appended drawings, in which:

FIG. 8 is a graph illustrating a guard interval;

DESCRIPTION OF THE PREFERRED EMBODIMENTS

Figure 1:
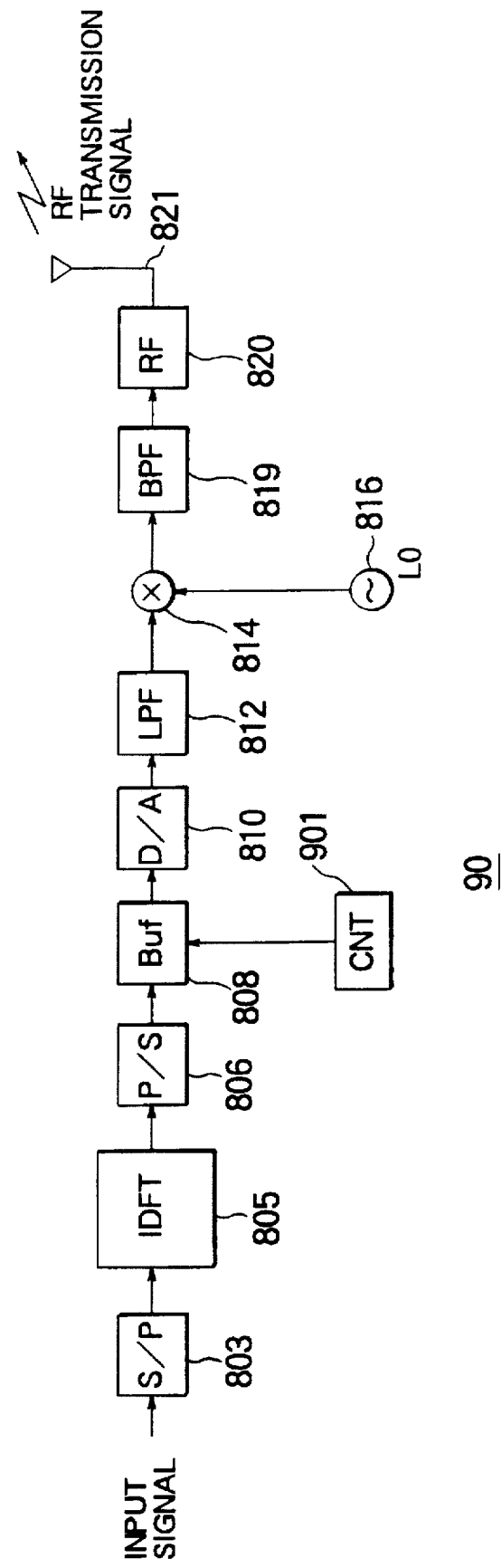
FIG. 1 is a view of the configuration of a conventional OFDM modulation apparatus.
Figure 2:
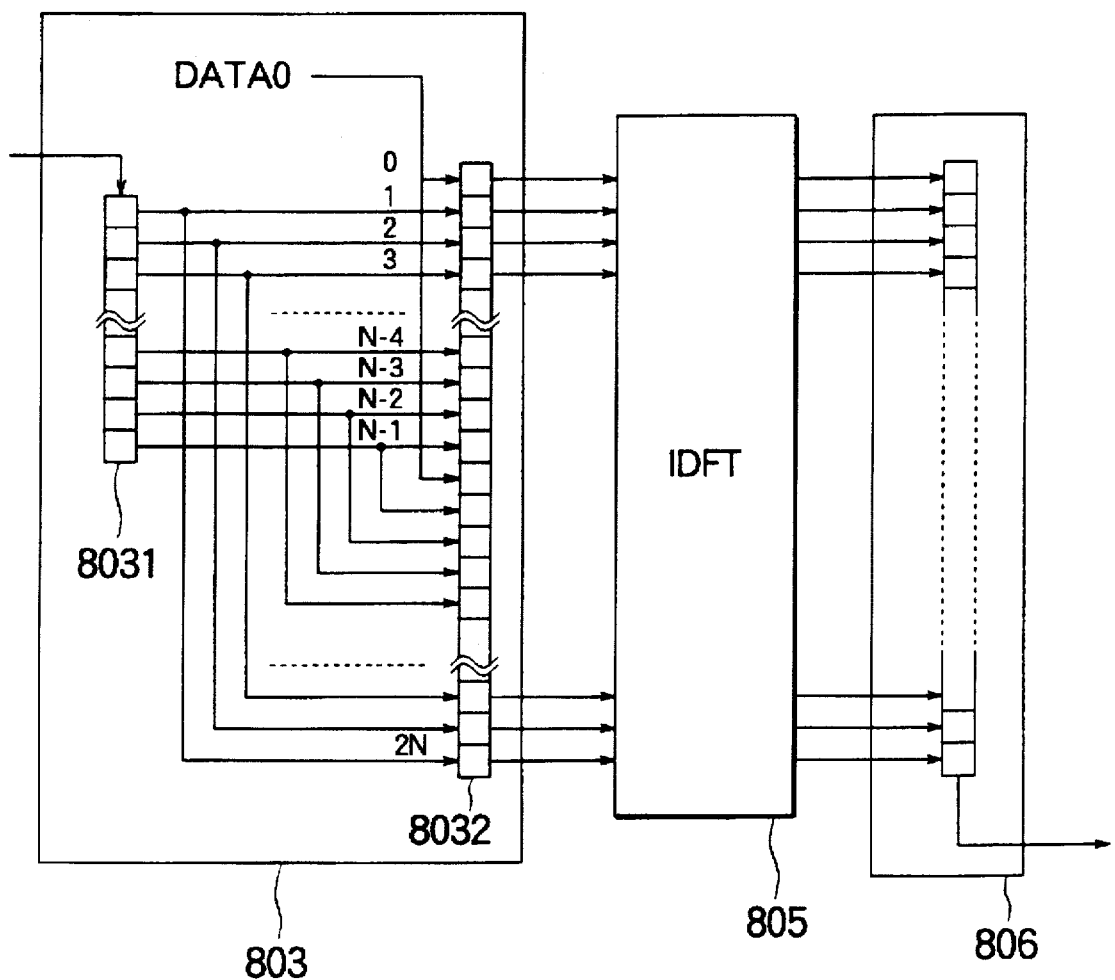
FIG. 2 is a view of the configuration of the serial/parallel converter shown in FIG. 1 and the connections with the IDFT circuit.
Figure 3A:
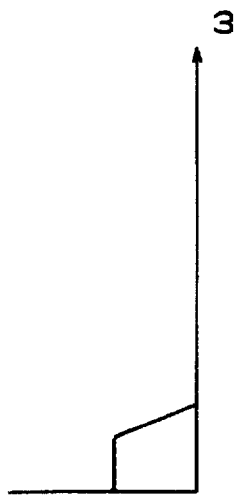
FIGS. 3A to 3C are views of the signal frequency spectra of the different parts of the OFDM modulation apparatus shown in FIG. 1.
Figure 3B:
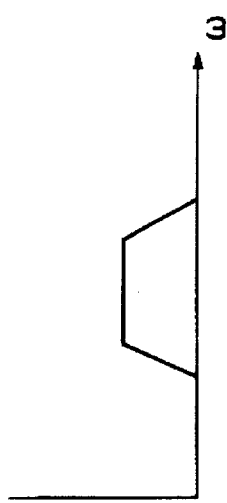
Figure 3C:
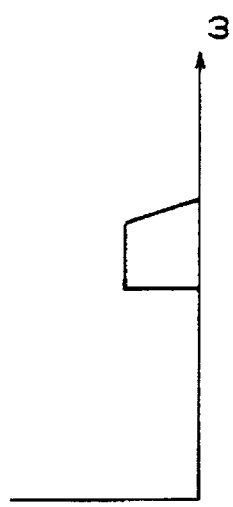
Figure 4:
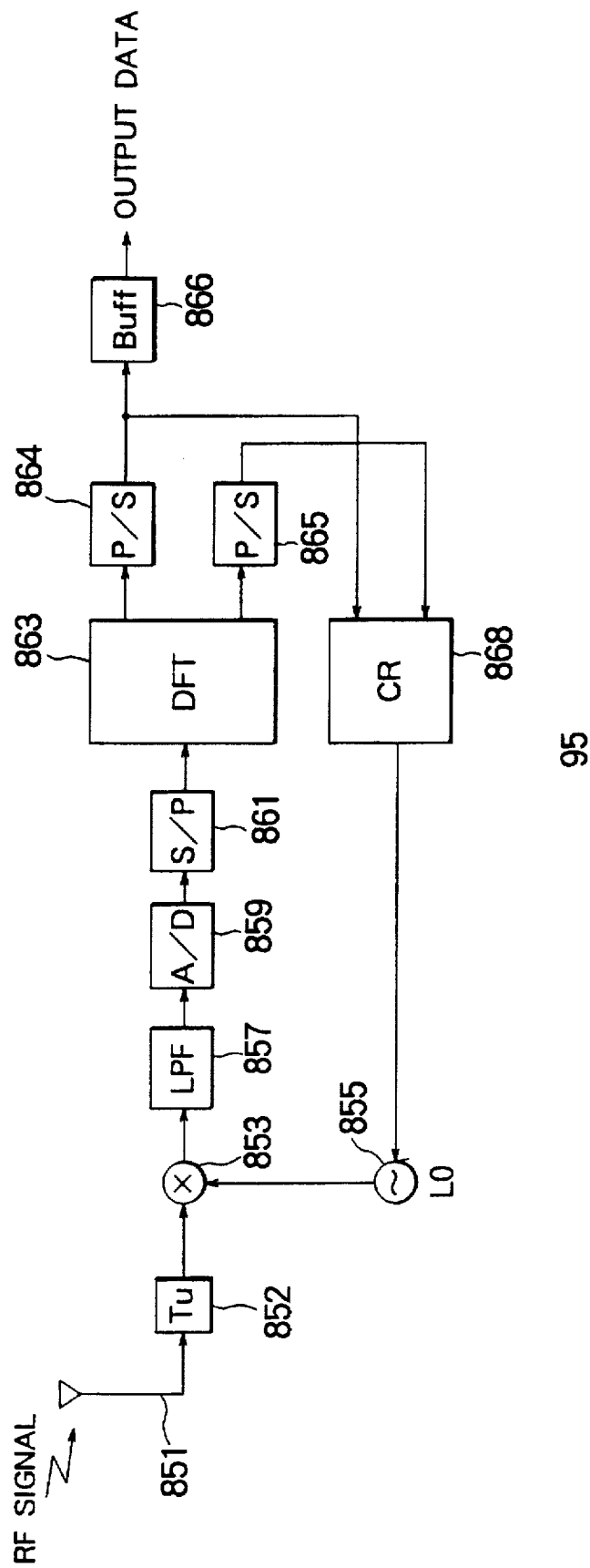
FIG. 4 is a view of the configuration of a conventional OFDM demodulation apparatus.

Before explaining the preferred embodiments of the present invention, an explanation will be given of an OFDM modulated signal using numerical equations.

In a 64 QAM or other general multi-level modulation system, a single carrier wave signal is modulated in amplitude or modulated in phase to transmit data in a predetermined band, but the OFDM modulation of the present invention performs transmission of digital data in a predetermined frequency band by modulating a plurality of carrier wave signals by a bit rate lower than the modulation methods using a single carrier wave signal.

If the number of carrier wave signals (number of symbols) of the OFDM modulated signals is made N and QAM modulation is performed on a plurality of carrier wave signals, the m-th symbol $f_m(t)$ of the OFDM signal is expressed by the following equation:

$$fm(t) = ST'(t - mT') \sum_{n=0}^{N-1} amn \cdot \exp j(n\omega_0 t + \phi mn + \Delta\phi mn) \quad (1)$$

where,
$ST'=1$, when $|t| \leq T'/2$
  $0$, when $|t| > T'/2$
$T'=T+T_g$
$\omega_o=2\pi/T$
T is width of time window of DFT
$T_g$ is guard interval
$a_{mn}$ is amplitude of n-th carrier wave signal of m-th symbol
$\phi_{mn}$ is phase of n-th carrier wave signal of m-th symbol In equation 1, $\Delta\phi_{m,n}$ is the term for correcting the phase rotation of the symbol by the guard interval, mentioned later, and is expressed by the following equation:

$$\Delta\phi mn = 2\pi mn Tg/T \quad (2)$$

From equation 1 and equation 2, the OFDM signal is expressed by the following equation:

$$f(t) = \sum_{m=-\infty}^{+\infty} fm(t) \quad (3)$$

$$= \sum_{m=-\infty}^{+\infty} \sum_{n=0}^{N-1} amn \cdot \exp j(n\omega_0 t + \phi mn + \Delta\phi mn) \cdot ST'(t - mT')$$

Below, the power spectrum of the OFDM modulated signals will be formularized.

The Fourier integral of the m-th symbol $f_m(t)$ of the time width T' of the m-th symbol expressed by equation 1 is expressed as follows:

$$Fm(\omega) = \int_{(m-1/2)T'}^{(m+1/2)T'} f(t)\exp(-j\omega t)dt \quad (4)$$

$$= T \sum_{n=0}^{N-1} amn \frac{\sin\frac{T}{2}(n\omega_0 - \omega)}{\frac{T}{2}(n\omega_0 - \omega)} \exp j[(n\omega_0 - \omega)mT + \phi mn + \Delta\phi mn]$$

From equation 4, the energy spectrum in the integral duration is expressed by the following equation:

$$|Fm(\omega)|^2 = Fm(\omega) \cdot Fm^*(\omega) \quad (5)$$

$$= T^2 \left( \sum_{n=0}^{N-1} amn \left\{ \frac{\sin\frac{T}{2}(n\omega_0-\omega)}{\frac{T}{2}(n\omega_0-\omega)} \right\} \right)^2 + \sum_{\substack{n=0 \\ k=0}}^{N-1} \sum_{k=n}^{N-1} amn\, amk \frac{\sin\frac{T}{2}(n\omega_0-\omega)\cdot\sin\frac{T}{2}(k\omega_0-\omega)}{\frac{T}{2}(n\omega_0-\omega)\cdot\frac{T}{2}(k\omega_0-\omega)} \cdot \exp j(n-k)\omega_0 mT$$

In the second term in equation 5, $$\sum_{n=0}^{N-1} \sum_{\substack{k=n \\ k=0}}^{N-1} amn \exp j n\omega_0 mT \cdot amk \exp(-jk\omega_0 mT) \quad (6)$$

is a correlation function of the modulation waves of the m-th and k-th carrier wave signals. If it is assumed there is no correlation between data, then the value of equation 6 becomes 0.

Accordingly, equation 3 may be modified as shownby the following equation:

$$|F(\omega)|^2 = \sum_{m=-\infty}^{+\infty} \sum_{n=0}^{N-1} amn^2 \left( \frac{\sin\frac{T}{2}(n\omega_0-\omega)}{\frac{T}{2}(n\omega_0-\omega)} \right)^2 \quad (7)$$

$$= \sum_{m=-\infty}^{+\infty} \sum_{n=0}^{N-1} \left( \frac{\sin\frac{T+Tg}{2}\left(\frac{2n\pi}{T}-\omega\right)}{\frac{T+Tg}{2}\left(\frac{2n\pi}{T}-\omega\right)} \right)^2$$

Next, an explanation will be given of the generation of the SSB signal in the OFDM method.

If the Hilbert transformation of the signal g(t) is expressed as g'(t), the upper side band (USB) signal $S_u(t)$ and the lower side band (LSB) signal $S_L(t)$ are expressed by the following equations:

$$Su(t) = \frac{1}{2} g(t)\cos \omega_c t - \frac{1}{2} g'(t)\sin \omega_c t \tag{8}$$

$$Se(t) = \frac{1}{2} g(t)\cos \omega_c t + \frac{1}{2} g'(t)\sin \omega_c t \tag{9}$$

Here, the Hilbert transformation g'(t) is defined by the following equation:

$$g'(t) = \frac{1}{\pi} \int_{-\infty}^{+\infty} \frac{g(\tau)}{t-\tau} d\tau \tag{10}$$

$$= g(t) * \frac{1}{\pi t}$$

That is, the output signal of the Hilbert transformation is the output signal in the case of inputting a signal to a filter so that the impulse response function h(t) becomes the following equation:

$$h(t)=1/\pi t \tag{11}$$

If the Fourier transformation of the impulse response function h(t) is H(ω), the following equation is obtained:

$$H(\omega) = \begin{cases} -j, & \text{when } \omega > 0 \\ 0, & \text{when } \omega = 0 \\ +j, & \text{when } \omega < 0 \end{cases} \tag{12}$$

Such a filter is usually called a Hilbert filter.

Figure 5A:
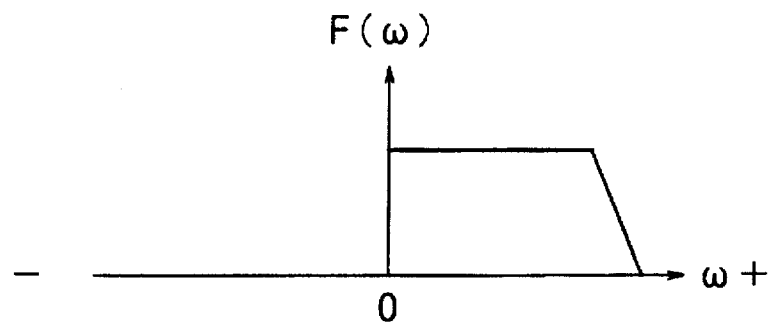
FIG. 5A is a graph showing the signal $F(\omega)$ with a spectrum present at just the positive frequency domain.
Figure 5B:
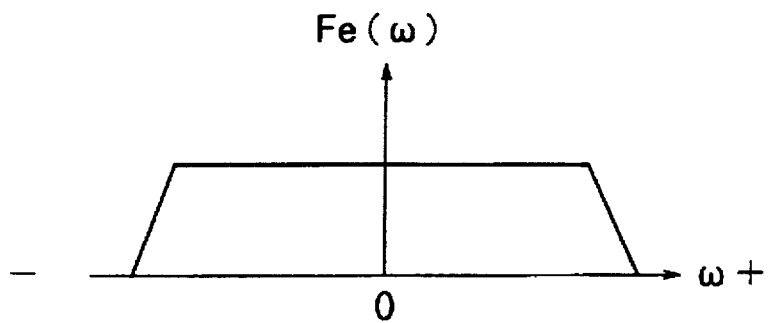
FIG. 5B is a graph showing the even function signal $F_e(\omega)$ at the time of breaking up $F(\omega)$ shown in FIG. 5A.
Figure 5C:
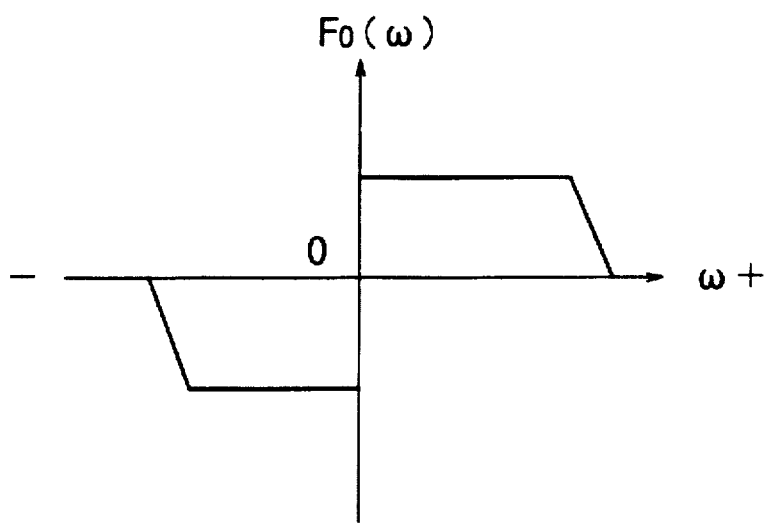
FIG. 5C is a graph showing the odd function signal $F_o(\omega)$ at the time of breaking up $F(\omega)$ shown in FIG. 5A.

Next, consider the Fourier transformation F(ω) of the signal f(t) having a spectrum only at the positive frequency domain as shown in FIGS. 5A to 5C.

FIG. 5A shows the signal F(ω) having a spectrum only at the positive frequency domain. FIG. 5B shows the even function signal $F_e(\omega)$ at the time of breaking down the F(107) shown in FIG. 5A, and FIG. 5C shows the odd function $F_o(\omega)$ at the time of breaking down the F(ω) shown in FIG. 5A.

The Fourier transformation F(ω) can be broken down into two functions shown in FIG. 5B and FIG. 5C.

That is, the Fourier transformation F(107) is expressed by the following equation:

$$F(\omega)=Fe(\omega)+F_o(\omega) \tag{13}$$

Further, the even function $F_e(\omega)$ shown in FIG. 5B and the odd function $F_o(\omega)$ shown in FIG. 5C are defined by the following equations:

$$Fe(\omega) = \frac{1}{2} [F(\omega) + F^*(-\omega)] \tag{14}$$

$$Fo(\omega) = \frac{1}{2} [F(\omega) - F^*(-\omega)] \tag{15}$$

Further, the relationship shown by the following equation exists between the even function $F_e(\omega)$ shown in FIG. 5B and the odd function $F_o(\omega)$ shown in FIG. 5C:

$$Fe(\omega)=Fo(\omega)\text{sgn } \omega$$

$$Fo(\omega)=Fe(\omega)\text{sgn } \omega \tag{16}$$

Here, if the inverse Fourier transformations of the even function $F_e(\omega)$ and the odd function $F_o(\omega)$ are found and designated as the function $f_e(t)$ and the function $f_o(t)$, these can be expressed by the following equations:

$$fe(t) = \frac{1}{2\pi} \int_{-\infty}^{+\infty} Fe(\omega) \exp(j\omega t) d\omega \tag{17}$$

$$= \frac{1}{2\pi} \int_{-\infty}^{+\infty} [R(\omega)\sin \omega t - X(\omega)\sin \omega t] d\omega$$

$$fo(t) = \frac{1}{2\pi} \int_{-\infty}^{+\infty} Fo(\omega) \exp(j\omega t) \tag{18}$$

$$= j\frac{1}{2\pi} \int_{-\infty}^{+\infty} [R(\omega)\sin \omega t - X(\omega)\sin \omega t] d\omega$$

In equations 17 and 18, R(ω) and X(ω) are the real number part and imaginary number part of F(ω) and the relationship of the following equation stands with the Fourier transformation F(ω).

$$F(\omega)=R(\omega)+jX(\omega) \tag{19}$$

Therefore, the function $f_e(t)$ is a real function and the function $f_o(t)$ is an imaginary function, it is learned.

In equation 18, consider the inverse Fourier transformation of the sin(ωt).

$$F^{-1}(sgn \ \omega) = \frac{1}{2\pi} \int_{-\infty}^{+\infty} sgn \ \omega \exp(j\omega t)d\omega = \frac{j}{\pi t} \tag{20}$$

That is, the following equations stand:

$$j/\pi t \leftrightarrows sgn\omega \tag{21}$$

$$fo(t) \leftrightarrows Fo(\omega) \tag{22}$$

$$fe(t) \leftrightarrows Fe(\omega) \tag{23}$$

Therefore, the following equations are obtained from equation 16 and equations 21 to 23 using the convolution integral theorum:

$$fe(t) = fo(t) * \frac{j}{\pi t} = \frac{j}{\pi} \int_{-\infty}^{+\infty} \frac{fo(\tau)}{t-\tau} d\tau \tag{24}$$

$$fo(t) = fe(t) * \frac{j}{\pi t} = \frac{j}{\pi} \int_{-\infty}^{+\infty} \frac{fe(\tau)}{t-\tau} d\tau \tag{25}$$

From equations 24 and 25, it is learned that the function $f_e(t)$ and the function $f_o(t)$ are in a Hilbert transformation relationship with each other.

Further, from equations 17 and 18, it is learned that the following processing may be performed to make the OFDM modulated signal a single side band since the function $f_e(t)$ is a real function and the function $f_o(t)$ is an imaginary function.

First, assume the function F(ω) where there is only a positive (negative) frequency component and the negative (positive) frequency component is 0.

Next, by performing inverse Fourier integration on the function F(ω), the time function $f_e(t)+jf_o(t)$ is obtained.

Next, if the upper side band signal is expressed as $S_u(t)$ and the lower side band signal is expressed as $S_L(t)$, the following equation is computed to obtain the SSB signal.

$$S_u(t)=f_e(t)\cos\omega_c t - f_o(t)\sin\omega_c t$$

$$S_L(t)=f_e(t)\cos\omega_c t + f_o(t) \sin \omega_c t$$

First Embodiment

An explanation will be made below of a first embodiment of the present invention.

The OFDM modulation apparatus and the OFDM demodulation apparatus of the present invention are used for the transmission of digital image data for example.

Figure 6:
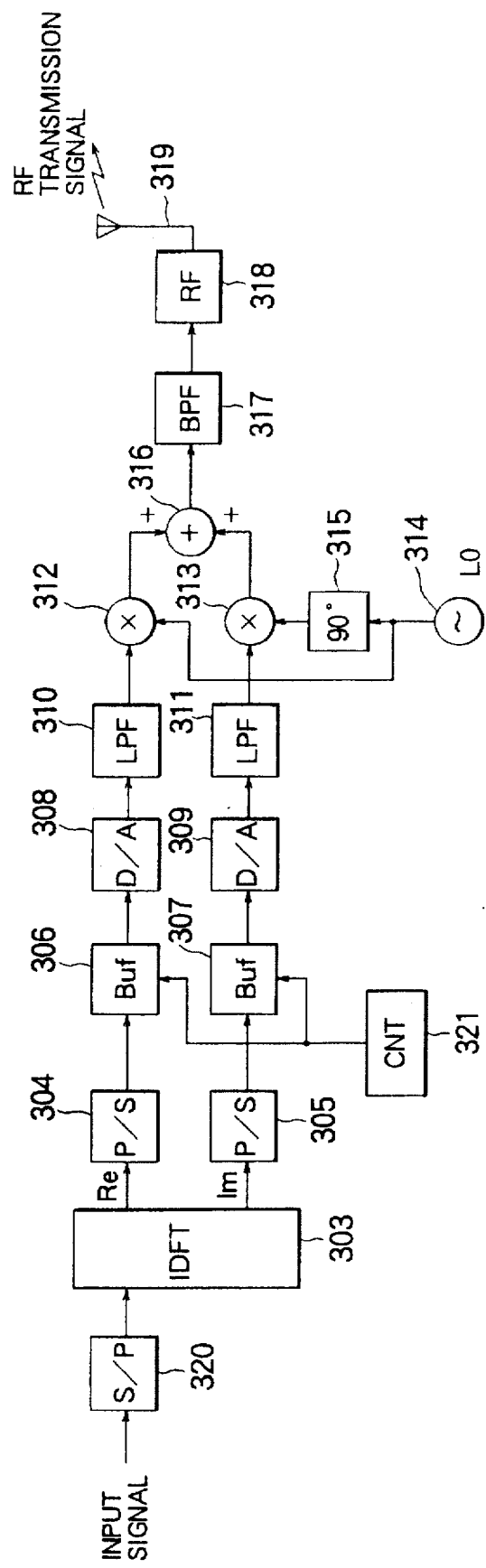
FIG. 6 is a view of the configuration of an OFDM modulation apparatus of an embodiment of the present invention.

FIG. 6 is a view of the configuration of an OFDM modulation apparatus 10 of the present invention.

In FIG. 6, the S/P converter 320 converts the serial format digital input signal to be transmitted into a parallel format and inputs it to the IDFT circuit 303.

The configuration of the S/P converter 320 will be explained later with reference to FIG. 7.

The IDFT circuit 303 is a 2N, for example, 1024 input IDFT circuit which performs IDFT processing on the input signal converted to a parallel format by the S/P converter 320 to transform the input signal from the frequency domain to the time domain and inputs the real number portion (Re) of the transformation results to the P/S converter 304 and the imaginary number part (Im) to the P/S converter 305.

The transformation performed at the IDFT circuit 303 is shown by the following equation:

$$x(n) = \frac{1}{N} \sum_{k=0}^{N-1} X(k) e^{j(2\pi k/N)} \quad (26)$$

where,

X(k) is data to IDFT circuit 303 x(n) is result of IDFT

The P/S converters 304 and 305 convert the real number part and imaginary number part of the transformation results of the IDFT circuit 303 into serial format data.

The buffer memories 306 and 307 add guard intervals to the output signals of the P/S converters 304 and 305.

The guard intervals will be explained later with reference to FIG. 8.

The buffer memory control circuit 321 controls the operation of the buffer memories 306 and 307.

The D/A converters 308 and 309 convert the signals of the buffer memories 306 and 307 to analog format signals and input them to the low pass filters 310 and 311.

The low pass filters 310 and 311 filter the transformation results of the D/A converters 308 and 309 and output the results to the multipliers 312 and 313.

The carrier wave signal generating circuit 314 produces the carrier wave signal and inputs it to the 90° phase shifter 315 and the multiplier 312.

The 90° phase shifter 315 shifts by 90° the carrier wave signal input from the carrier wave signal generating circuit 314 and inputs the result to the multiplier 313.

The multipliers 312 and 313 respectively multiply the output signals of the low pass filter 310 and 311 with the carrier wave signal and the carrier wave signal shifted 90° in phase by the 90° phase shifter 315 and input the results to the adder 316.

The adder 316 adds and combines the output signals of the multipliers 312 and 313.

The band pass filter 317 filters the output signal of the adder 316.

The RF converter 318 converts the output signal of the band pass filter 317 to a predetermined frequency and sends it out from the transmission antenna 319.

An explanation will now be given of the configuration of the S/P converter 320.

Figure 7:
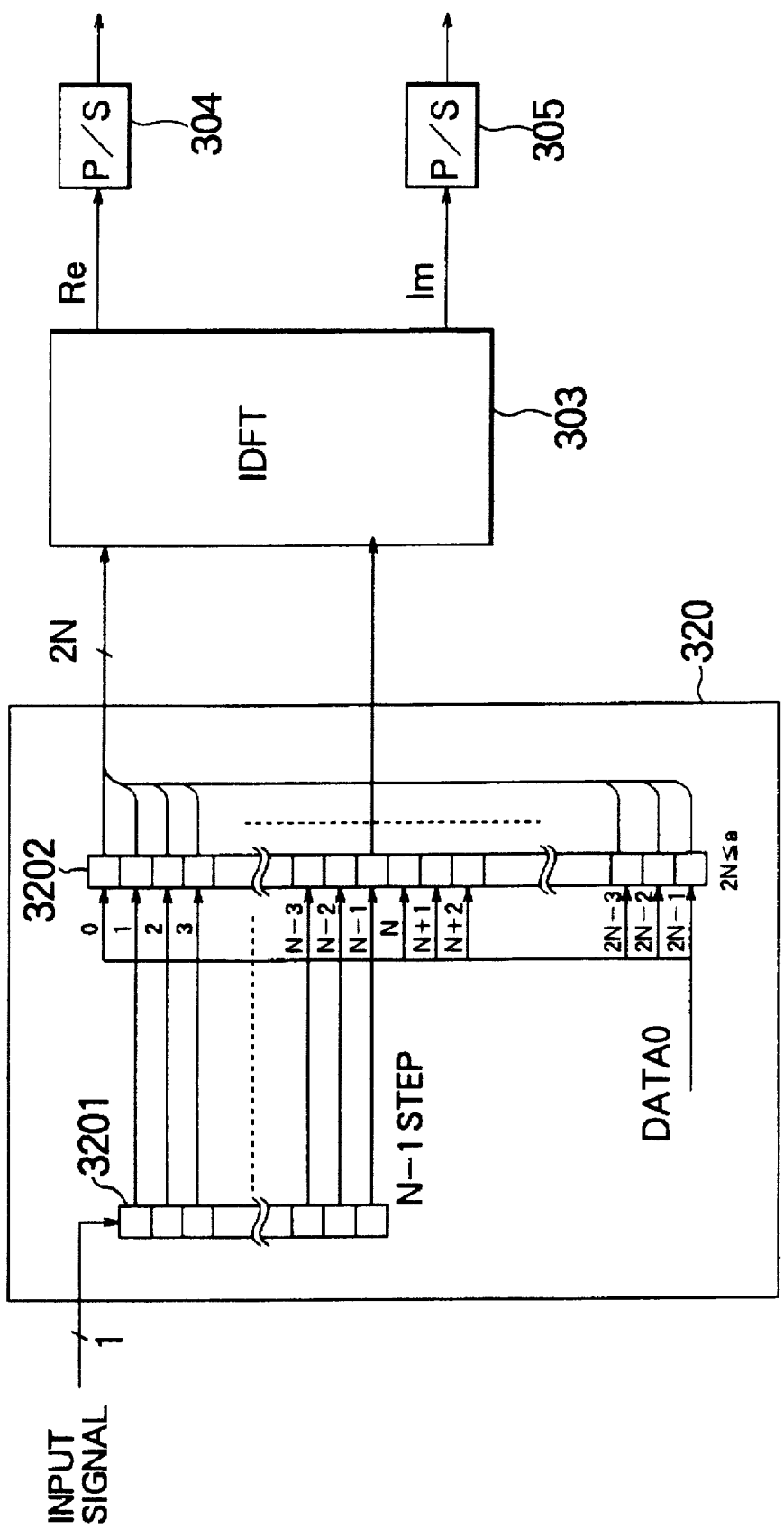
FIG. 7 is a view of the configuration of a S/P converter shown in FIG. 6.

FIG. 7 is a view showing the configuration of the S/P converter 320.

The shift register 3201 is a 1-input N−1-output shift register.

The latch 3202 is a 2N stage construction latch circuit. It latches the output signals of the shift register 3201 at the 1 stage and N−1 stage and latches a fixed value, for example, 0, at the other stages (0 stage and N stage to 2N−1 stage) and inputs the data to the IDFT circuit 303.

The input signal is converted to a parallel format data by the shift register 3201, is latched at the above stages of the latch 3202, and is input to the IDFT circuit 303 in a form of the array latched in the latch 3202.

An explanation will next be made of the operation of the OFDM modulation apparatus 10.

The serial format digital input signal is input to the S/P converter 320 and converted to a parallel format signal with a fixed value (0) added to predetermined portions as mentioned above.

By inputting the input signal converted to a parallel format signal by the S/P converter 320 into the 2N input signal for the 2N input IDFT circuit 303, the imaginary number portion of the output signal of the IDFT circuit 303 becomes the Hilbert transformation of the real number portion.

Here, it is known that by modulating a certain signal and the Hilbert transformation result of that signal by two orthogonal carrier waves having the same frequency and combining the results of the modulation, it is possible to take out only the single side band signal of the modulated signals.

The OFDM modulation apparatus 10 of the present invention produces a single side band signal using this fact.

That is, based on the control of the buffer memory control circuit 321, the buffer memories 306 and 307 add guard intervals to the real number part and imaginary number part of the output signals of the IDFT circuit 303.

FIGS. 8A and 8B are views for explaining the guard interval.

A guard interval is a signal added to the symbols of an OFDM modulated signal for giving a margin to the signal for elimination of the effects of multiple path interference etc.

FIG. 8A shows the waveform of a transmission signal with no guard interval, while FIG. 8B shows the waveform of a transmission signal with a guard interval added.

The OFDM modulated signal is produced by multiplexing a plurality of carrier wave signals and a guard interval $T_g$ is added as shown in FIG. 8B to the IDFT durations $T_a$ of all the carrier wave signals.

FIGS. 8A and 8B show the carrier wave signal #1 and the carrier wave signal #2 of a frequency twice that of the carrier wave signal #1, but the same applies to other carrier wave signals even when performing OFDM modulation using three or more carrier wave signals.

The guard interval $T_g$ is added by adding the beginning portion of the symbols of a carrier wave signal to the end of the symbols.

This processing corresponds to the addition of the beginning portion of the symbols of the output signal of the IDFT circuit 303 to the end of the symbols. As shown in FIG. 6, this can be simply performed by controlling the buffer memories 306 and 307 by the buffer memory control circuit 321. These circuits can be easily formed as an integrated circuit.

The output signals of the buffer memories 306 and 307 are converted to analog signals by the D/A converters 308 and 309. These signals are then filtered by the low pass filters 310 and 311.

The multipliers 312 and 313 multiply the output signals of the low pass filters 310 and 311 with the carrier wave signal input from the carrier wave signal generating circuit 314 and the carrier wave signal shifted 90° in phase by the 90° phase shifter 315.

The adder 316 adds and combines the signals input from the multipliers 312 and 313 and inputs the results to the band pass filter 317.

The band pass filter 317 filters the output signal of the adder 316 to a predetermined band. The RF converter 318 further converts this to a predetermined transmission frequency, amplifies it, and sends it out to the receiving side as a transmission signal through the transmission antenna 319.

Note that in the first embodiment, only the lower side band (LSB) is obtained as the single side band (SSB) by adding the two orthogonally modulated signals by the adder 316, but it is also possible to use a subtractor instead of the adder 316 and use subtraction to cut out only the upper side band (USB).

Second Embodiment

An explanation will next be made of a second embodiment of the present invention.

Figure 9:
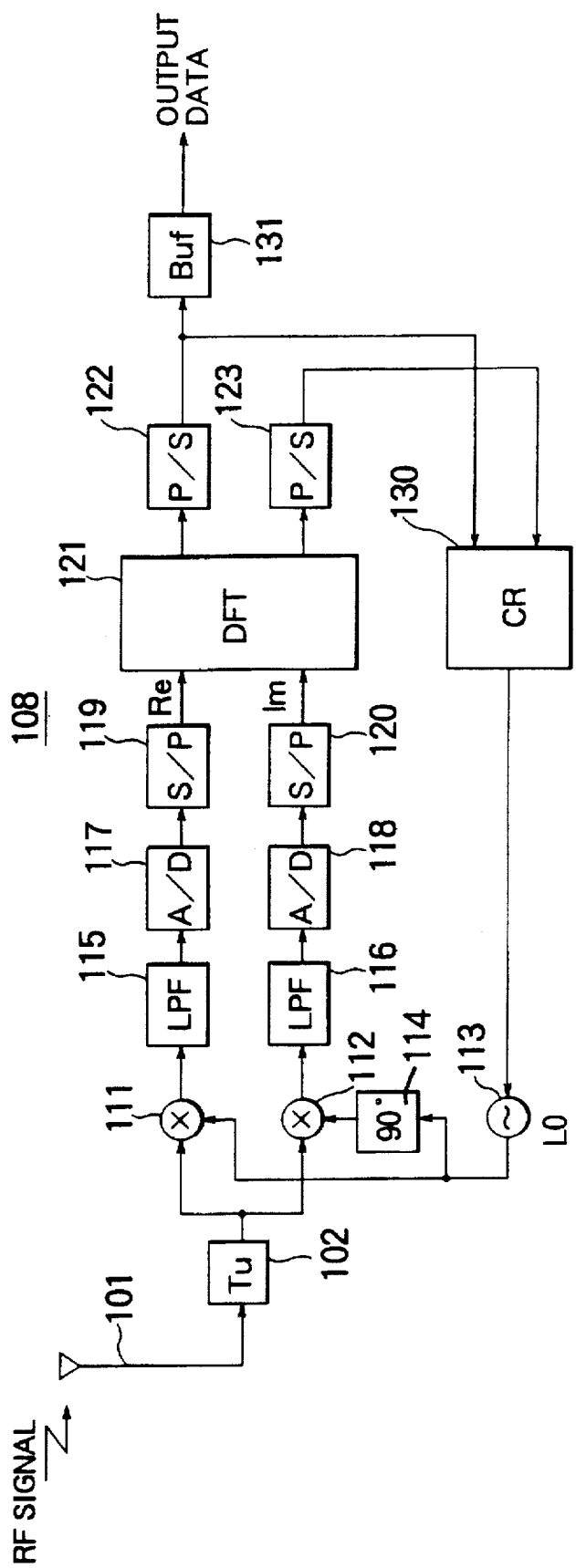
FIG. 9 is a view of the configuration of an OFDM demodulation apparatus of an embodiment of the present invention.

FIG. 9 is a view of the configuration of the OFDM demodulation apparatus 108 of the second embodiment of the present invention. In FIG. 9, the receiving antenna 101 captures the signal OFDM modulated by the OFDM modulation apparatus 80 and sent as a radio signal.

The tuner 102 converts the signal captured by the receiving antenna 101 to the predetermined intermediate frequency band, amplifies it, and inputs it to the demodulation apparatus.

The multipliers 111 and 112 multiply the received signals of the intermediate frequency band input from the tuner 102 with the output signal of the local oscillator 113 and the output signal of the local oscillator shifted 90° in phase by the 90° phase shifter 116 and input the results to the low pass filters 115 and 116.

The low pass filters 115 and 116 pass only the components of the output signals of the multipliers 111 and 112 which are below a predetermined high cutoff frequency to remove the unnecessary frequency components and input the results to the A/D converters 117 and 118 and a clock reproduction circuit (not shown).

The A/D converters 117 and 118 convert the analog format signals input from the low pass filters 115 and 116 to digital format signals.

The S/P converters 119 and 120 convert the serial format digital signals input from the A/D converters 117 and 118 to parallel format signals and input them to the DFT circuit 121.

The DFT circuit 121 is a 2N, 1024 input DFT circuit comprised for example of a digital signal processor. It transforms the digital signals input from the S/P converters 119 and 120 from the time domain to the frequency domain (DFT) and inputs the results to the P/S converters 122 and 123.

The transformation performed at the DFT circuit 121 is shown by the following equation.

$$X(k) = \sum_{n=0}^{N-1} x(n) e^{-j(2\pi k/N)} \quad (27)$$

where,

X(k) is result of DFT x(n) is input data to DFT circuit 121.

The P/S converters 122 and 123 convert the parallel format digital signals input from the DFT circuit 121 to serial format signals and input them to the buffer memory 131 and the carrier wave signal reproduction circuit 130 as below.

The buffer memory 131 performs processing on the signal input from the P/S converter 122 so as to for example remove the guard intervals and outputs the results as the I channel signal and the Q channel signal.

The carrier wave signal reproduction circuit 130 is for example comprised of a Costas circuit and controls the local oscillator 113 to generate a local oscillation signal of a predetermined frequency based on the output signals of the P/S converters 122 and 123.

The local oscillator 113 is for example a voltage controlled oscillator (VCO) and generates a local signal of a predetermined frequency under the control of the carrier wave signal reproduction circuit 130.

The 90° phase shifter 114 shifts the phase of the output signal of the local oscillator 113 by 90° and inputs the result to the multiplier 112.

The operation of the OFDM demodulation apparatus 108 now be explained.

The tuner 102 amplifies a received signal produced by the OFDM modulation apparatus 10 shown in the first embodiment, for example, and captured by the receiving antenna 101, converts it to a signal of a predetermined intermediate frequency band, and inputs the result to the multipliers 111 and 112.

The multipliers 111 and 112 multiply the input signal from the tuner 102 with the orthogonal carrier wave signals produced by the local oscillator 113 and shifted 90° in phase by the 90° phase shifter 114 to convert them to the base band signals and input the results to the low pass filters 115 and 116.

These base band signals are filtered by the low pass filters 115 and 116 and are converted to digital format signals by the A/D converters 117 and 118.

The output signals of the A/D converters 117 and 118 are converted to parallel format signals by the S/P converters 119 and 120 which are then input to the real number part input and imaginary number part input of the DFT circuit 121 and subjected to DFT.

The DFT results are converted to serial format signals by the P/S converters 122 and 123, are converted in rate by the buffer memory 131, cleared of the guard intervals, and output as the output data.

As explained above, the OFDM demodulation apparatus 108 of the present invention supplies the real number part input of the DFT circuit 121 from the S/P converter 119 and the OFDM signal of the base band converted by a reproduced carrier wave signal from the phase shifter 114 and hence orthogonal to the imaginary part input, the level of the signal input to the DFT circuit 121 is doubled and it is possible to improve the signal power to noise power ratio of the transformation output of the DFT circuit 121.

Figure 10:
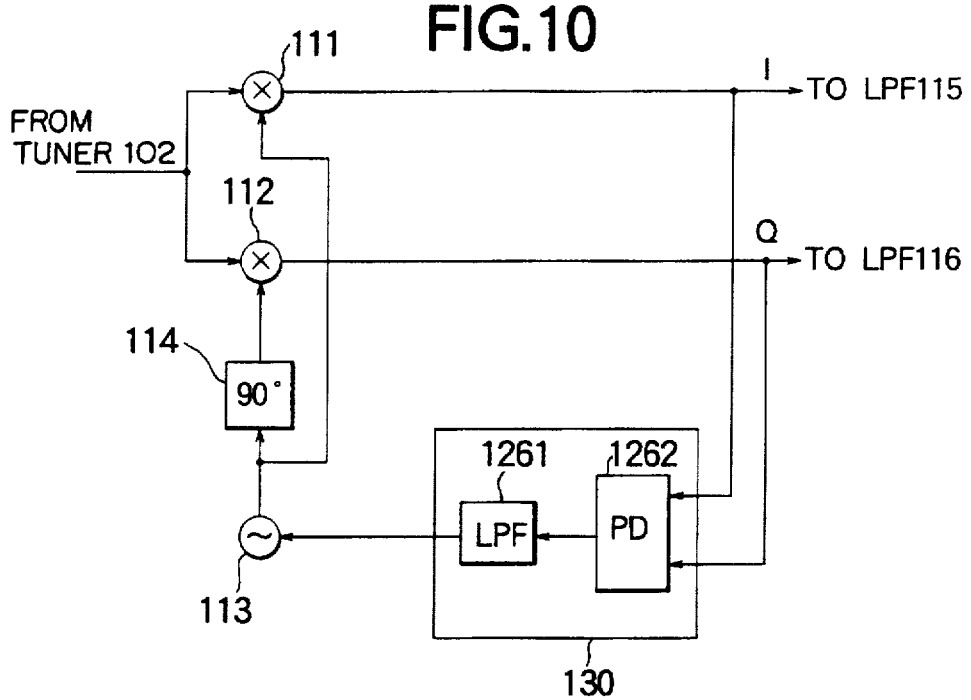
FIG. 10 is a view of the configuration of a Costas loop used in the OFDM demodulation apparatus shown in FIG. 9.

FIG. 10 is a view of the configuration of the Costas loop used in the OFDM demodulation apparatus 108.

In FIG. 10, the Costas loop of the OFDM demodulation apparatus 108 is comprised of the multiplier 111, the multiplier 112, the carrier wave signal reproduction circuit 130, the local oscillator 113, and the 90° phase shifter 114.

Further, the carrier wave signal reproduction circuit 130 is comprised of a low pass filter 1261 and a phase comparator 1262.

Figure 11:
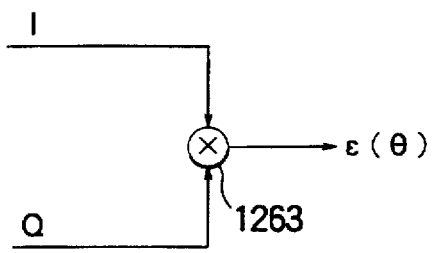
FIG. 11 is a view of the configuration of a phase comparator shown in FIG. 10.

FIG. 11 shows an example of a possible configuration of the phase comparator 1262.

The phase comparator 1262 is comprised of a multiplier 1263 and outputs the phase error $\epsilon(\theta)$ of the I channel signal and Q channel signal.

Figure 12:
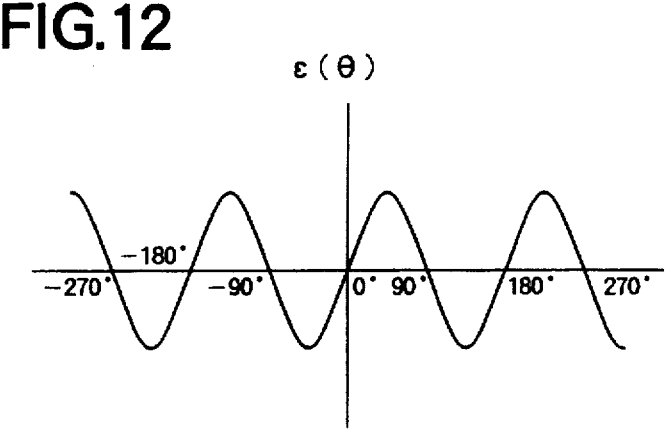
FIG. 12 is a view of the relationship between the phase error of the reproduced carrier wave signal and the phase difference $\epsilon$.

FIG. 12 is a view of the relationship between the phase error of the reproduced carrier wave signal and the phase difference $\epsilon(\theta)$.

In general, the local oscillator 113 reproduces a carrier wave signal with the same frequency as that of the carrier wave produced by the oscillator or generator 314 at the transmission side. This is multiplied with the OFDM modulated signal of the intermediate frequency band converted by the tuner 102, whereby the OFDM modulated signal of the intermediate frequency band is converted to a signal of the base band.

When reproducing a BPSK carrier wave signal using the Costas loop shown in FIG. 10, by applying the Costas computation represented in FIG. 11 on the I channel signal and the Q channel signal, the reproduced carrier wave signal phase error characteristic shown in FIG. 12 is obtained.

By controlling the local oscillator 113 based on the phase error signal shown in FIG. 12, it is possible to reproduce the carrier wave signals.

A Costas loop is used for the reproduction of the carrier wave signals of the OFDM modulated signal because it is necessary to compute the carrier wave signal orthogonal to the phase of the carrier wave signal output of the local oscillator 113 and the demodulated signal, as shown in FIG. 10.

However, when receiving the OFDM modulated signal, it is possible to use the imaginary number portion of the output signal of the DFT circuit 121 as the demodulated output based on the carrier wave signal consisting of the output signal of the local oscillator 113 shifted 90° by the 90° phase shifter.

Therefore, the Costas loop processing shown in FIG. 12 can be realized by the carrier wave signal reproduction circuit 130.

In this case, if the phase of the carrier wave signal of the local oscillator 113 is correctly reproduced, the imaginary number portion of the output signal of the DFT circuit 121 will always become 0 and only the real number portion will have significance.

Note that in the above embodiments, the explanation was made of the case of performing one-dimensional transformation on the carrier wave signals for simplification of the explanation, but the method of modulation is not limited to a one-dimensional modulation method and may be a two-dimensional modulation method as well.

The OFDM modulation apparatus and the OFDM demodulation apparatus of the present invention can take many forms in addition to those shown in the above embodiments, as shown by the modifications in the embodiments for example.

As explained above, according to the present invention, not only is the output from the real number part obtained as the output from the IDFT at the transmission side, but also a Hilbert transformation output of the real number part output is obtained from the imaginary number part, so it is possible to simply produce a signal (SSB signal) comprised only of a single side band by transforming these two outputs by two orthogonal carrier wave signals with the same frequency and combining the results.

According to the present invention, since carrier wave signals are reproduced from the received input signal and demodulation performed by two orthogonal reproduced carrier wave signals which are used as the real number part and imaginary number part input of a DFT circuit, the input level is doubled and it is possible to improve the ratio of the received signal power to noise power.

What is claimed is:

1. An orthogonal frequency division multiplex (OFDM) modulation apparatus comprising:
    a frequency domain/time domain converting means for converting an input signal from a frequency domain to a time domain and outputting the results of the conversion divided into a real number portion and an imaginary number portion; the frequency domain/time domain converting means comprising:
    means for performing IDFT of digital data provided in parallel format to a plurality of IDFT input terminals thereof; and
    means for applying the input signal to a first portion of the IDFT input terminals and a time-invariant value to a second portion of the IDFT input terminals;
the orthogonal frequency division multiplex modulation apparatus further comprising:
    orthogonal transformation means for using the real number portion and imaginary number portion of the results of conversion to modulate and combine carrier wave signals having a phase difference of 90° from each other.

2. A modulation apparatus as set forth in claim 1, wherein the time-invariant value is 0.

3. An orthogonal frequency division multiplex (OFDM) demodulation apparatus for demodulating an input OFDM modulated signal through conversion thereof from a time domain to a frequency domain, the input OFDM modulated signal being produced through inverse discrete Fourier transformation (IDFT) of input data by supplying the input data to a first set of input terminals of an IDFT apparatus and a time-invariant value to a second set of input terminals of the IDFT apparatus to produce a real number output and an imaginary number output therefrom, the input OFDM modulated signal comprising a first carrier wave signal modulated by the real number output and a second carrier wave signal modulated by the imaginary number output, the second carrier wave signal differing in phase by 90° from the first carrier wave signal, the OFDM demodulation apparatus comprising:
    demodulation means for converting the input OFDM modulated signal to first and second base band signals using respective locally generated signals differing in phase by 90° and corresponding with the first and second carrier wave signals, the first and second base band signals corresponding respectively to the real number output and the imaginary number output from the IDFT apparatus; and
    time domain/frequency domain converting means for converting the first and second base band signals from a time domain to a frequency domain, the time domain/frequency domain converting means comprising discrete Fourier transform means having a real number input coupled with the demodulation means to receive the first base band signal and an imaginary number input coupled with the demodulation means to receive the second base band signal, the discrete Fourier transform means serving to convert the first and second base band signals to a plurality of transformation coefficients as outputs of the demodulation apparatus.

4. An orthogonal frequency division multiplex (OFDM) modulation apparatus comprising:
    frequency domain/time domain converting means for converting an input signal from a frequency domain to a time domain and for dividing the results of the conversion into a real number output portion and an imaginary number output portion which is a Hilbert transformation of the real number output portion,
    means for generating first and second carrier wave signals differing in phase by 90°,
    orthogonal transformation means for modulating said first carrier wave signal with said real number output portion and for modulating said second carrier wave signal with said Hilbert transformation of said real number output portion, and means for combining said first carrier wave signal modulated by said real number output portion and said second carrier wave signal modulated by said Hilbert transformation of said real number output portion so as to output only a single side band signal.

5. An orthogonal frequency division multiplex (OFDM) demodulation apparatus for demodulating an input OFDM modulated signal comprised of first and second carrier wave signals differing in phase from each other by 90° and being modulated respectively by real and imaginary number output portions produced through inverse discrete Fourier transformation (IDFT) of input data such that the imaginary number output portion is a Hilbert transformation of the real number output portion, the ODFM demodulation apparatus comprising:

demodulation means for converting the input OFDM modulated signal to a first base band signal and a second base band signal which is a Hilbert transformation of the first base band signal, the demodulation means employing a first locally generated signal to convert the OFDM modulated signal to said first base band signal and a second locally generated signal differing in phase from the first locally generated signal by 90° to convert the OFDM modulated signal to said second base band signal; and time domain/frequency domain converting means for converting the first and second base band signals from a time domain to a frequency domain, the time domain/frequency domain converting means comprising discrete Fourier transform means having a real number input coupled with said demodulation means to receive said first base band signal and an imaginary number input coupled with said demodulation means to receive said second base band signal, the discrete Fourier transform means serving to convert said first and second base band signals to a plurality of transformation coefficients as outputs of the demodulation apparatus.

* * * * *